(12) United States Patent
Rivas Romero

(10) Patent No.: US 9,810,042 B1
(45) Date of Patent: Nov. 7, 2017

(54) OIL WELL SIMULATION TOOL

(71) Applicant: Schlumberger Technology Corporation, Sugar Land, TX (US)

(72) Inventor: Olegario Rivas Romero, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 320 days.

(21) Appl. No.: 14/688,509

(22) Filed: Apr. 16, 2015

Related U.S. Application Data

(60) Provisional application No. 61/980,371, filed on Apr. 16, 2014.

(51) Int. Cl.
  *E21B 41/00* (2006.01)
  *G09B 9/00* (2006.01)
  *G09B 25/02* (2006.01)

(52) U.S. Cl.
  CPC .......... *E21B 41/00* (2013.01); *E21B 41/0092* (2013.01)

(58) Field of Classification Search
  CPC .......... G09B 9/00; G09B 25/02; G05B 17/00; E21B 41/00; E21B 41/0092; G01N 33/28; G01N 33/2823
  USPC ............................................. 175/207; 703/10
  See application file for complete search history.

(56) References Cited

U.S. PATENT DOCUMENTS

| 1,954,561 | A | * | 4/1934 | Cygon | G09B 25/02 |
| | | | | | 434/126 |
| 3,971,926 | A | | 7/1976 | Gau et al. | |
| 4,251,217 | A | * | 2/1981 | Brasseux | G09B 25/02 |
| | | | | | 434/219 |
| 4,290,759 | A | * | 9/1981 | Seabourn | G09B 9/00 |
| | | | | | 434/370 |
| 4,304,122 | A | * | 12/1981 | Tentor | G01N 15/0826 |
| | | | | | 73/152.07 |
| 4,458,520 | A | * | 7/1984 | Adame | G09B 25/02 |
| | | | | | 166/252.5 |
| 5,320,425 | A | * | 6/1994 | Stephenson | B28C 7/02 |
| | | | | | 209/1 |
| 2012/0221308 | A1 | * | 8/2012 | Chen | G09B 9/00 |
| | | | | | 703/10 |
| 2014/0090450 | A1 | * | 4/2014 | Dugwell | G01N 17/008 |
| | | | | | 73/61.41 |

* cited by examiner

*Primary Examiner* — Kenneth L Thompson

(57) ABSTRACT

Various implementations directed to an oil well simulation tool are provided. In one implementation, the oil well simulation tool may include a reservoir tank configured to contain a working fluid, where the working fluid represents a reservoir fluid in a subterranean reservoir. The oil well simulation tool may also include a constant pressure device configured to receive the working fluid from the reservoir tank, where the constant pressure device is configured to maintain a substantially constant pressure within the device. The oil well simulation tool may further include a well tank assembly configured to receive the working fluid from a pipe coupled to the constant pressure device. The oil well simulation tool may additionally include a separator tank configured to receive the working fluid from the well tank assembly and configured to store the working fluid.

20 Claims, 6 Drawing Sheets

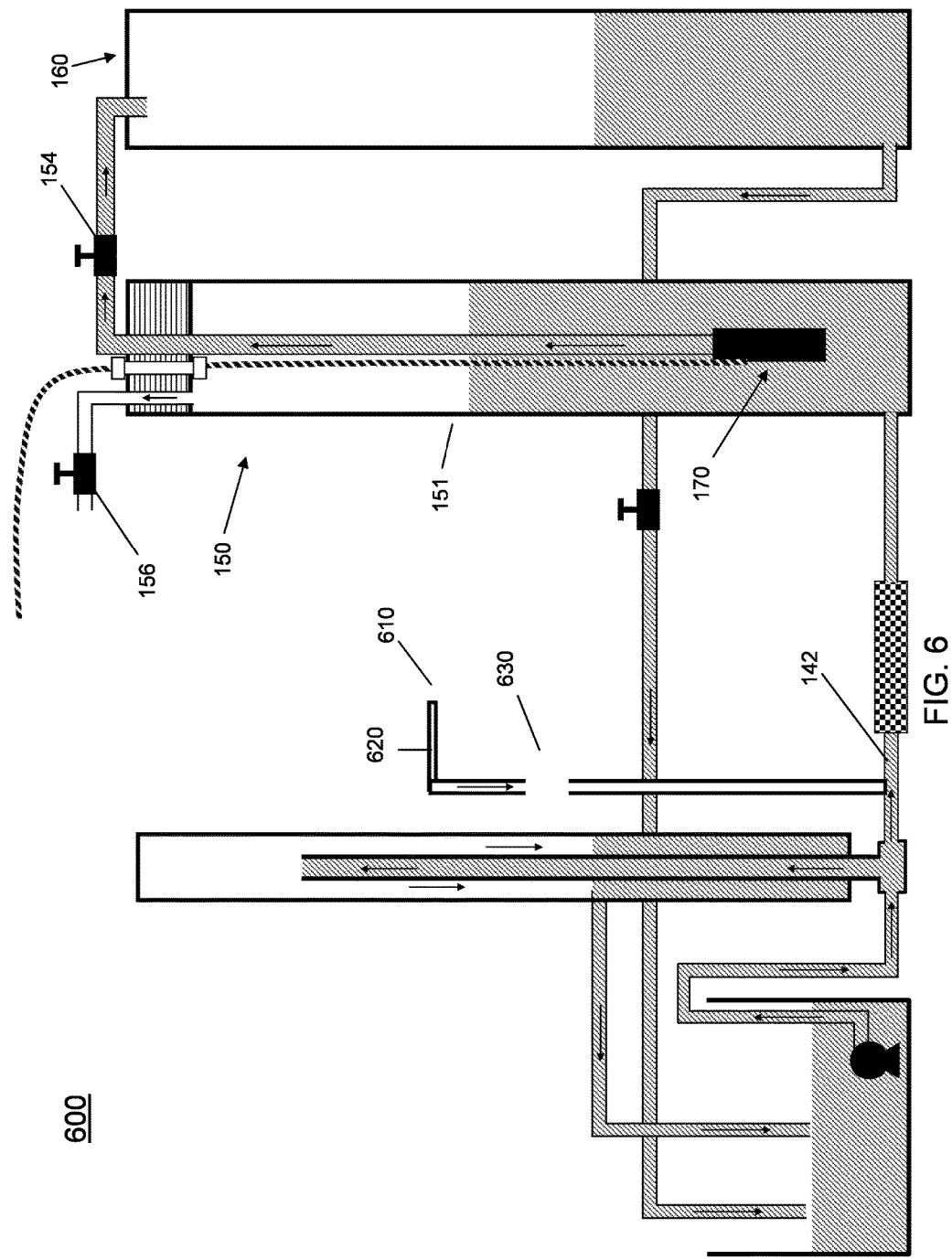

OIL WELL SIMULATION TOOL

CROSS-REFERENCE TO RELATED APPLICATIONS

This application claims benefit of U.S. provisional patent application Ser. No. 61/980,371, filed Apr. 16, 2014 and titled OIL WELL SIMULATOR, the entire disclosure of which is herein incorporated by reference.

BACKGROUND

Operations, such as surveying, drilling, wireline testing, completions, and production, may involve various subsurface activities used to locate and gather hydrocarbons from a subterranean reservoir. One or more oil or gas wells may be positioned in the subterranean reservoir, where the wells may be provided with tools capable of advancing into the ground and removing hydrocarbons from the subterranean reservoir. Production facilities may be positioned at surface locations to collect the hydrocarbons from the wells. In particular, a reservoir fluid containing these hydrocarbons may be drawn from the subterranean reservoir and passed to the production facilities using equipment and other transport mechanisms, such as tubing. Increased understandings of conditions of the subterranean reservoir, the wells, and/or the production facilities may assist with the ability locate and gather hydrocarbons.

SUMMARY

Various implementations directed to an oil well simulation tool are provided. In one implementation, the oil well simulation tool may include a reservoir tank configured to contain a working fluid, where the working fluid represents a reservoir fluid in a subterranean reservoir. The oil well simulation tool may also include a constant pressure device configured to receive the working fluid from the reservoir tank, where the constant pressure device is configured to maintain a substantially constant pressure within the device. The oil well simulation tool may further include a well tank assembly configured to receive the working fluid from a pipe coupled to the constant pressure device. The oil well simulation tool may additionally include a separator tank configured to receive the working fluid from the well tank assembly and configured to store the working fluid.

In another implementation, a method may include activating a lift mechanism of a well tank assembly in an oil well simulation tool, thereby transferring working fluid from the well tank assembly to a separator tank of the tool. The method may also include closing a return pipe coupled between the separator tank and a reservoir tanks, thereby transferring the working fluid from the separator tank to the reservoir tank. The method may further include determining a first amount of volume of the working fluid in the separator tank after the return pipe is closed. The method may additionally include determining a second amount of volume of the working fluid in the separator tank after a predetermined amount of time. The method may also include determining a flow rate of the working fluid in the oil well simulation tool based on the first amount of volume, the second amount of volume, and the predetermined amount of time.

In yet another implementation, the oil well simulation tool may include components configured to simulate an oil well site, where at least one of the components is substantially transparent.

In yet another implementation, the oil well simulation tool may include a permeable device configured to simulate a permeability of a subterranean reservoir.

In yet another implementation, the oil well simulation tool may include a constant pressure device configured to maintain a substantially constant pressure within the device in order to simulate a pressure within a subterranean reservoir.

In yet another implementation, the oil well simulation tool may include a reservoir tank configured to contain a working fluid, where the working fluid represents a reservoir fluid in a subterranean reservoir. The oil well simulation tool may also include a constant pressure device that includes an inner tubing and an outer tubing that is positioned concentrically around the inner tubing. The constant pressure device may be configured to receive the working fluid from the reservoir tank and maintain a substantially constant pressure within the device. The oil well simulation tool may further include a well tank assembly configured to receive the working fluid from a pipe coupled to the constant pressure device. The oil well simulation tool may additionally include a separator tank configured to receive the working fluid from the well tank assembly and configured to store the working fluid.

The above referenced summary section is provided to introduce a selection of concepts in a simplified form that are further described below in the detailed description section. The summary is not intended to be used to limit the scope of the claimed subject matter. Furthermore, the claimed subject matter is not limited to implementations that solve any disadvantages noted in any part of this disclosure. Indeed, the systems, methods, processing procedures, techniques, and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various techniques will hereafter be described with reference to the accompanying drawings. It should be understood, however, that the accompanying drawings illustrate the various implementations described herein and are not meant to limit the scope of various techniques described herein.

FIG. 6 illustrates an oil well simulation tool with an air compressor in accordance with implementations of various techniques described herein.

DETAILED DESCRIPTION

Figure 1:
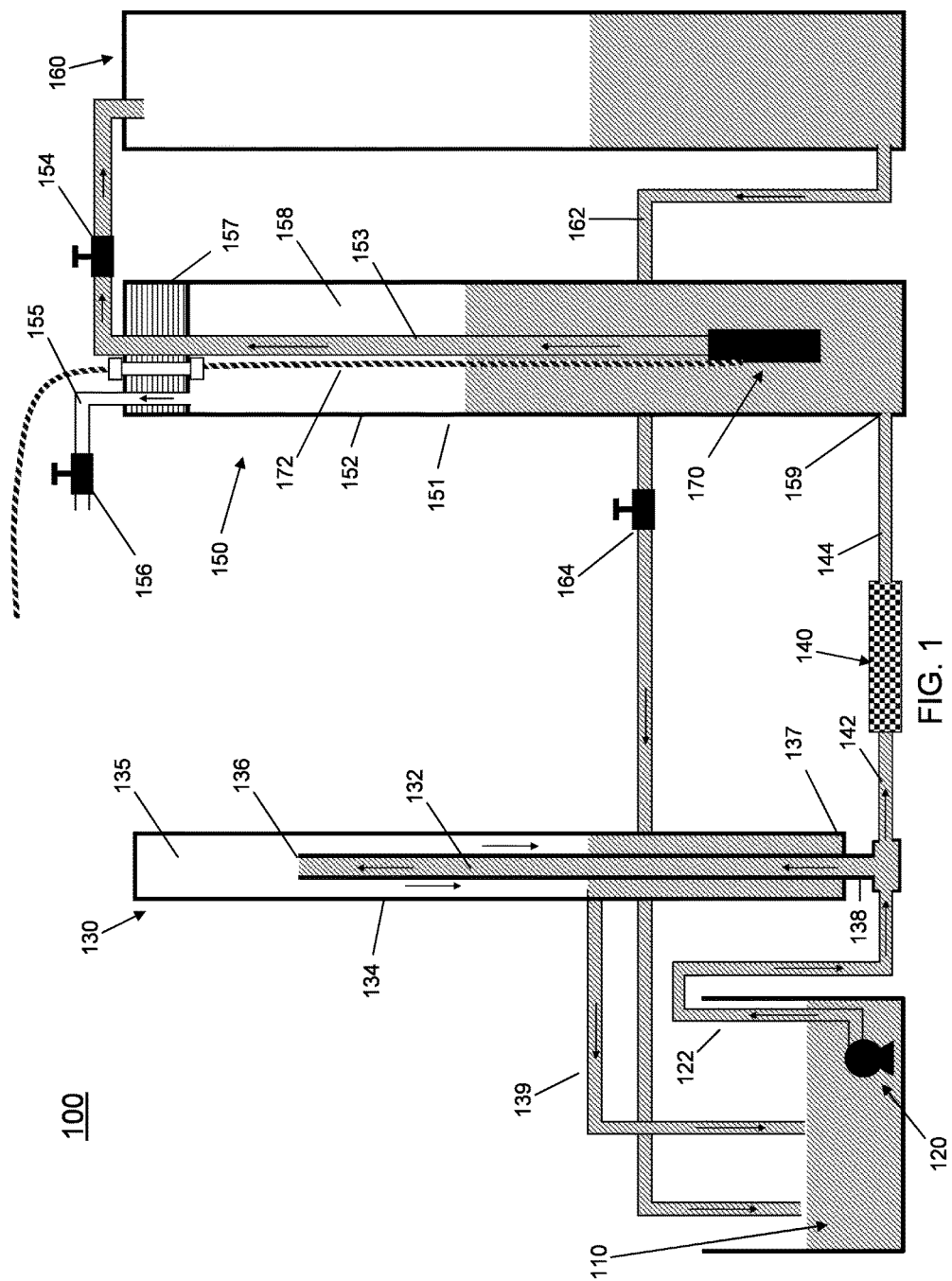
FIG. 1 illustrates an oil well simulation tool in accordance with implementations of various techniques described herein.

The discussion below is directed to certain specific implementations. It is to be understood that the discussion below is for the purpose of enabling a person with ordinary skill in the art to make and use any subject matter defined now or later by the patent "claims" found in any issued patent herein.

It is specifically intended that the claims not be limited to the implementations and illustrations contained herein, but include modified forms of those implementations including portions of the implementations and combinations of elements of different implementations as come within the scope of the following claims.

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to obscure aspects of the embodiments.

It will also be understood that, although the terms first, second, etc. may be used herein to describe various elements, these elements should not be limited by these terms. These terms are used to distinguish one element from another. For example, a first object could be termed a second object, and, similarly, a second object could be termed a first object, without departing from the scope of the claims. The first object and the second object are both objects, respectively, but they are not to be considered the same object.

The terminology used in the description of the present disclosure herein is for the purpose of describing particular implementations and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses one or more possible combinations of one or more of the associated listed items. It will be further understood that the terms "includes" and/or "including," when used in this specification, specify the presence of stated features, integers, operations, elements, and/or components, but do not preclude the presence or addition of one or more other features, integers, operations, elements, components and/or groups thereof.

As used herein, the terms "up" and "down"; "upper" and "lower"; "upwardly" and "downwardly"; "below" and "above"; and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate.

It should also be noted that in the development of any such actual implementation, numerous decisions specific to circumstance may be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The terminology and phraseology used herein is solely used for descriptive purposes and should not be construed as limiting in scope. Language such as "having," "containing," or "involving," and variations thereof, is intended to be broad and encompass the subject matter listed thereafter, equivalents, and additional subject matter not recited.

Furthermore, the description and examples are presented solely for the purpose of illustrating the different embodiments, and should not be construed as a limitation to the scope and applicability. While any composition or structure may be described herein as having certain materials, it should be understood that the composition could optionally include two or more different materials. In addition, the composition or structure may also include some components other than the ones already cited. It should also be understood that throughout this specification, when a range is described as being useful, or suitable, or the like, it is intended that any value within the range, including the end points, is to be considered as having been stated. Furthermore, respective numerical values should be read once as modified by the term "about" (unless already expressly so modified) and then read again as not to be so modified unless otherwise stated in context. For example, "a range of from 1 to 10" is to be read as indicating a respective possible number along the continuum between about 1 and about 10. In other words, when a certain range is expressed, even if a few specific data points are explicitly identified or referred to within the range, or even when no data points are referred to within the range, it is to be understood that the inventors appreciate and understand that any data points within the range are to be considered to have been specified, and that the inventors have possession of the entire range and points within the range.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

One or more implementations of various techniques for an oil well simulation tool will now be described in more detail with reference to FIGS. 1-6 in the following paragraphs.

Oil Well Simulation Tool

As known to those skilled in the art, an oil production field may include subterranean formations containing one or more reservoirs. Based on data from a survey operation, one or more drilling operations may be performed on the subterranean formations, where the drilling operations may produce at least one wellbore (i.e., an oil well) that extends through a subterranean formation, including through a reservoir. This reservoir may contain fluids, such as hydrocarbons. The oil well may draw the reservoir fluid through perforations in the casing of the well, and may pass the reservoir fluid to one or more processing facilities via surface networks. In one scenario, the surface networks may use pipes and control mechanisms for controlling the flow of reservoir fluids from the oil well to a processing facility.

Estimating and/or analyzing a production capability of an oil well with accuracy may depend on an accurate understanding of how operational conditions at an oil well site can affect the extraction of reservoir fluids from the subterranean reservoir. In particular, certain operational conditions at the oil well site may affect a particular flow rate of reservoir fluid produced by the oil well.

Accordingly, various implementations described herein are directed to an oil well simulation tool may be used to assist with learning about production at an oil well. In particular, the oil well simulation tool may be used to reproduce actual operational conditions of a real world oil well at a smaller scale, which may assist with understanding various processes involved in oil production and/or the effect that the operational conditions may have on reservoir fluid production. In some scenarios, such a tool may be employed as part of a training process in the oil industry.

FIG. 1 illustrates an oil well simulation tool 100 in accordance with implementations of various techniques described herein. In some implementations, the tool 100 can be assembled, disassembled, and reassembled for transportation purposes. In particular, the tool 100 may include a reservoir tank 110, a reservoir pump 120, a constant pressure device 130, a permeable device 140, a well tank assembly 150, and a separator tank 160. In one implementation, the reservoir tank 110, the reservoir pump 120, the constant pressure device 130, the permeable device 140, the well tank assembly 150, the separator tank 160, and their associated components (as further described below), including the non-limiting examples of tubing and/or pipes, may be composed of transparent or substantially transparent material (e.g., the non-limiting examples of glass, plastic, or other suitable materials).

The reservoir tank 110 may be a tank configured to store a working liquid for use in the oil well simulation tool 100. In particular, the reservoir tank 110 may be used to simulate at least part of a subterranean reservoir, and the working liquid may be representative of the reservoir fluid that may be disposed in the reservoir. The working liquid used in the tool 100 may include water. Other implementations for the working liquid may include canola oil, corn oil, girasol oil, and other forms of oil which may be representative of the reservoir fluids. In some implementations, the reservoir tank 110 may have an open top configuration to allow one or more pipes to access the working fluid stored therein, as further described below.

The reservoir pump 120 may be used to pump the working fluid out of the reservoir tank 110. In particular, the reservoir pump 120 may be used to pump the working fluid out of the reservoir tank 110 by increasing a pressure of the working fluid in the reservoir tank 110, which may simulate the energy (i.e., pressure) in the subterranean reservoir. In some implementations, the reservoir pump 120 may be disposed within the working fluid in the reservoir tank 110. The reservoir pump 120 may also be powered by electricity. Further, in some implementations, the working fluid may be pumped away from the reservoir tank 110 via a reservoir pipe 122 coupled to the reservoir pump 120.

The constant pressure device 130 may be coupled to the reservoir pipe 122 and may be configured to receive the working fluid that has been discharged from the reservoir pump 120. The constant pressure device may be composed of inner tubing 132 and outer tubing 134, where the outer tubing 134 is positioned concentrically around the inner tubing 132. As noted above, the inner tubing 132 and the outer tubing 134 may be composed of substantially transparent material. The inner tubing 132 may extend into a cavity 135 of the outer tubing 134, where a top portion 136 of the inner tubing 132 may be open within the cavity 135. A bottom portion 137 of the outer tubing 134 may form a substantially watertight seal with an outer surface of the inner tubing 132.

A bottom portion 138 of the inner tubing 132 may be coupled to the reservoir pipe 122 such that it may receive the working fluid from the reservoir pump 120. The flow of working fluid from the reservoir pump 120 may fill up the inner tubing 132 to the edge of its open, top portion 136. The working fluid may fill up the inner tubing 132, where an overflow of the working fluid from the top portion 136 of the inner tubing 132 may spill into and collect in the cavity 135 of the outer tubing 134. An output pipe 139 may be coupled to the cavity 135, and may be used to transfer the collected working fluid in the cavity 135 back to the reservoir tank 110. In one implementation, the output pipe 139 may feed directly into an open top of the reservoir tank 110.

Such a configuration may lead to a substantially constant pressure within the constant pressure device 130. In particular, the reservoir pump 120 may be configured to discharge the working fluid at such a rate that the inner tubing 132 may remain constantly filled with working fluid. In such a scenario, and as known to those skilled in the art, this substantially constant column of working fluid in the inner tubing 132 may lead to a substantially constant pressure within the inner tubing 132. In particular, the pressure within the inner tubing 132 may be calculated by multiplying a pressure gradient of the working fluid by a depth of the working fluid within the inner tubing 132 (i.e., the height of the inner tubing 132). Given that the pressure gradient and the depth of the working fluid may remain substantially constant, the pressure within the inner tubing 132 may also be substantially constant. In one implementation, the constant pressure device 130 and its inner tubing 132 may be substantially transparent, allowing for observation and/or measurement of the depth (i.e., height) of the working fluid within the constant pressure device 130.

This substantially constant pressure within the constant pressure device 130 may be used to simulate a substantially constant pressure that may exist within some subterranean reservoirs. In particular, the substantially constant pressure within the inner tubing 132 may simulate a reservoir pressure ($P_R$) as is known in the art.

The pressure of the working fluid within a pipe 142 connected to the constant pressure device 130 may also be substantially constant. The working fluid in the pipe 142 may feed into an input of the permeable device 140. The permeable device 140 may be a container that is coupled to the pipe 142 and configured to simulate a permeability that may be present in a subterranean formation containing a reservoir. In one implementation, the permeable device 140 may be filled with any combination of media such as beads, marbles, or other suitable three-dimensional objects in order to simulate a permeability of rocks of the formation. The media (i.e., the beads, marbles, and three-dimensional objects) may be of any size, and may be made of any material known to those in the art, including transparent materials, such as the non-limiting examples of plastic or glass. In some implementations, the sizes of the media may be altered to simulate a different permeability of the subterranean formation. The permeable device 140 may receive the working fluid from the pipe 142 one on side of the device 140, and may output the working fluid to a pipe 144 connected to another side of the permeable device 140.

In one implementation, the reservoir tank 110, the reservoir pump 120, the constant pressure device 130, the permeable device 140, and their associated components (e.g., pipes) as described above may together represent a subterranean reservoir proximate to an oil well.

The well tank assembly 150 may represent an oil well proximate to a subterranean reservoir. The well tank assembly may include a container 151 having an outer surface 152, the outer surface 152 being representative of a production casing of an oil well. The container 151 may have a similar height as that of the constant pressure device 130. In some implementations, the container 151 may be cylindrical. In another implementation, the container 151 may have a top portion, where the top portion may be closed and/or sealed using a wellhead 157. The wellhead 157 may be a plug, cap, or other suitable closure that may be placed within the top portion of the container 151, and which may include one or more ports (as further described below).

The working fluid may be received from the pipe 144 via an opening 159 of the container 151. The opening 159 may represent a perforation in the production casing of an oil well. The working fluid may collect in a cavity 158 of the container 151, where the cavity 158 may be representative of an annular space of an oil well. In one implementation, the working fluid may flow in a direction from the constant pressure device 130 to the well tank assembly 150 if the substantially constant pressure (as described above) is greater than a pressure within the cavity 158. This may be similar to a real world scenario where reservoir fluids may flow from a reservoir to an oil well if the reservoir pressure is greater than a pressure within the oil well.

The well tank assembly 150 may also include a production pipe 153, which may be used to transfer the working fluid out of the cavity 158 and into the separator tank 160. The production pipe 153 may be representative of at least a portion of a completion inside of an oil well (e.g., production tubing). A production valve 154 may be incorporated into the production pipe 153 at a position outside of the container 151 and the separator tank 160. As such, the flow of working fluid out of the container 151 and into the tank 160 via the production pipe 153 may be controlled by the production valve 154. In one implementation, closing the production valve 154 may simulate a shut-in condition of an oil well.

The production pipe 153 may extend from the cavity 158 and through the wellhead 157. The wellhead 157 may contain one or more ports which allow components such as the production pipe 157 to pass from the cavity 158 to outside of the container 151. Further, the wellhead 157 may be considered to be part of the completion of an oil well.

In the real world, if a minimum energy (i.e., pressure) threshold is not met within the oil well, then reservoir fluid may not be produced naturally to the surface. Accordingly, one or more pumping means may be used to produce the reservoir fluid. Similarly, the well tank assembly 150 may use one or more lift mechanisms to transfer the working fluid out of the cavity 158. In one implementation, an artificial lift mechanism may be used to produce the working fluid, i.e., to transfer the working fluid from the cavity 158 via the production pipe 153. In one such implementation, an electric submersible pump (ESP) 170 may be used to pump the working fluid out of the cavity 158. In some implementations, other pumps may be used for the artificial lift mechanism.

The ESP 170 may be coupled to a bottom portion of the production pipe 153 within the cavity 158, and may pump the working fluid out of the well tank assembly 150 via the production pipe 153. The ESP 170 may be considered to be part of the completion of an oil well. The ESP 170 may be powered via a power cable 172, which may connect to the ESP 170 within the cavity 158. The cable may pass from the cavity 158 to outside of the container 151 via a port of the wellhead 157. The power cable 172 may also be considered to be part of the completion.

When powered on, the ESP 170 may pump the working fluid from within the cavity 158 to the separator tank 160 via production pipe 153. This operation may simulate the production of reservoir fluid from an oil well to a surface of the oil well site. The ESP 170 may be also be configured to vary its pump speed of the working fluid.

The well tank assembly 150 may also include a gas pipe 155. The gas pipe 155 may extend from the cavity 158 to outside of the container 151 using a port of the wellhead 157. The gas pipe 155 may also have a gas valve 156 incorporated therein that may be positioned outside of the container 151. The gas valve 156 may be used to simulate an annular gas venting of an oil well if the valve is open, and may simulate a no venting condition if the valve is closed. As noted above, components of the well tank assembly 150, such as the gas pipe 155, production pipe 153, and/or the container 151, may be composed of substantially transparent material.

The separator tank 160 may be of similar size and construction as that of the container 151. In some implementations, the separator tank 160 may be cylindrical. The separator tank 160 may receive the working fluid from the well tank assembly via the production pipe 153. The separator tank 160 may also include a return pipe 162 connected to a cavity of the tank 160 and also to the reservoir tank 120. The return pipe 162 may also have a return valve 164 incorporated therein. When the return valve 164 is open, the working fluid may transfer from the cavity of the tank 160 to the reservoir tank 120. When the return valve 164 is closed, the working fluid may be collected and stored within the cavity of the separator tank 160. The working fluid collected within the separator tank 160 may be representative of reservoir fluids which have been produced at the surface by a real world oil well.

The reservoir tank 110, the constant pressure device 130, the permeable device 140, the well tank assembly 150, the separator tank 160, and their associated components (as further described below), including the non-limiting examples of tubing, pipes and other suitable fluid and gas conveyance systems, may be configured to have any volume or size as known to those skilled in the art.

Oil Well Simulation Tool Applications

Using the oil well simulation tool as described above, one or more applications may be performed.

Flow Rate

In one implementation, the oil well simulation tool may be used to determine a flow rate of the working fluid being produced by its well tank assembly. This determination may be used to simulate the process used to determine a flow rate of reservoir fluid produced by a real world oil well.

Figure 2:
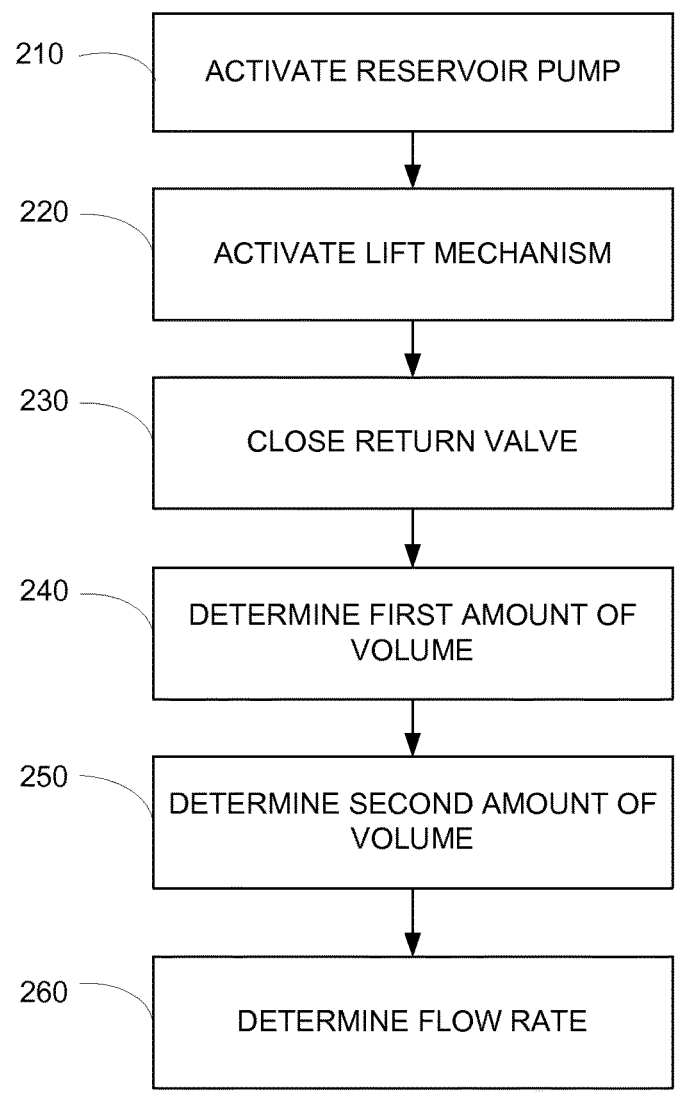
FIG. 2 illustrates a flow diagram of a method for determining a flow rate of the working fluid being produced by a well tank assembly in accordance with implementations of various techniques described herein.

FIG. 2 illustrates a flow diagram of a method 200 for determining a flow rate of the working fluid being produced by a well tank assembly 150 in accordance with implementations of various techniques described herein. In one implementation, method 200 may be performed using the oil well simulation tool 100. It should be understood that while method 200 indicates a particular order of execution of operations, in some implementations, certain portions of the operations might be executed in a different order. Further, in some implementations, additional operations or blocks may be added to the method. Likewise, some operations or blocks may be omitted.

Initially, the one or more pumps (e.g., the reservoir pump 120) and the lift mechanisms (e.g., the ESP 170) of the tool 100 may be inactive. In addition, the valves (e.g., production valve 154, gas valve 156, and return valve 164) may be open. In such initial conditions, the working fluid may be isolated in the reservoir tank 110. The constant pressure device 130, the permeable device 140, the well tank assembly 150, the separator tank 160, and their associated components (e.g., tubing, pipes, etc.) may be empty.

At block 210, the reservoir pump 120 may be activated. However, the lift mechanisms (e.g., the ESP 170) of the tool 100 may remain inactive and the valves (e.g., production valve 154, gas valve 156, and return valve 164) may remain open.

Figure 3:
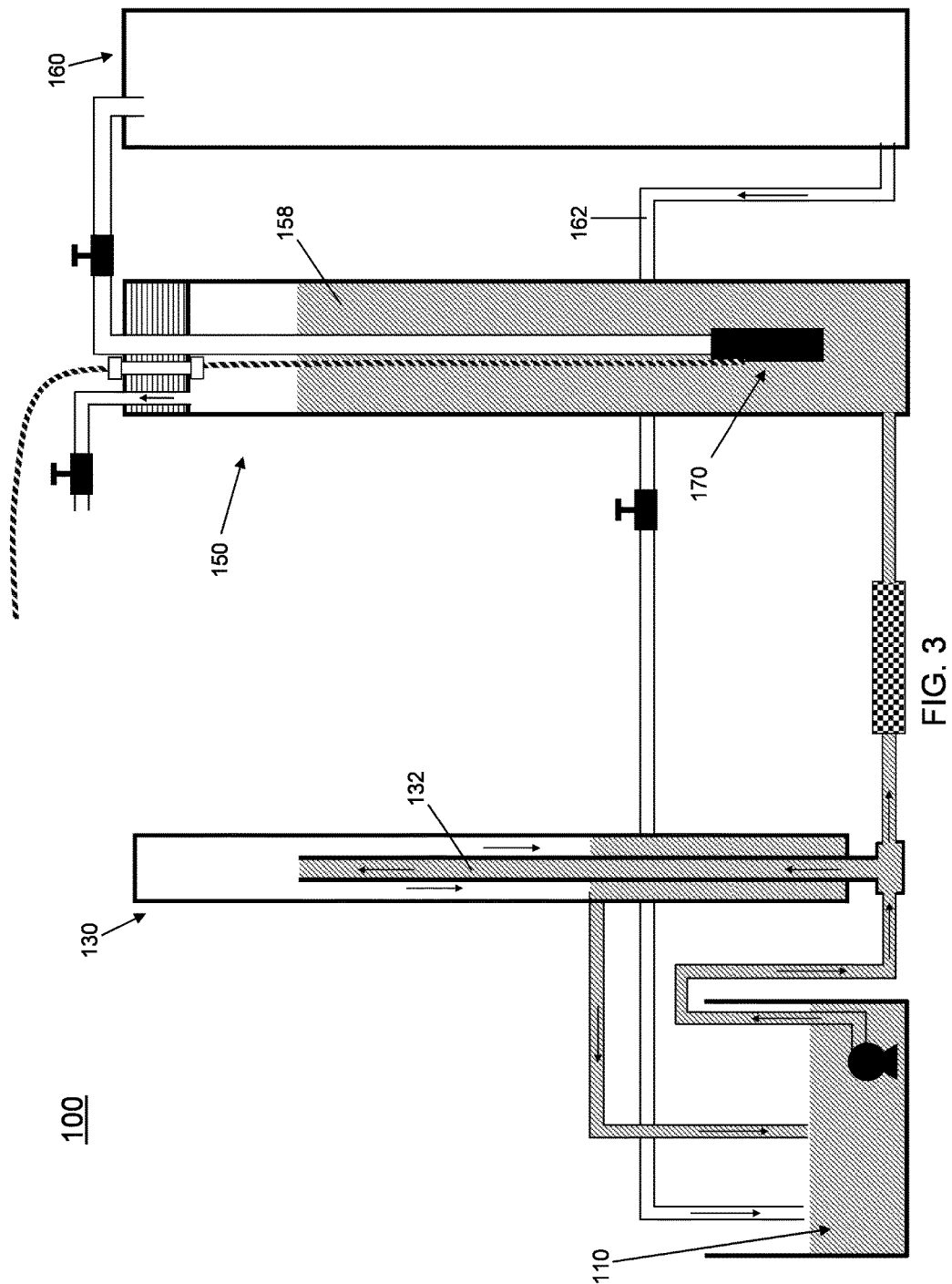
FIG. 3 illustrates an oil well simulation tool with a reservoir pump activated in accordance with implementations of various techniques described herein.

FIG. 3 illustrates an oil well simulation tool 100 with the reservoir pump 120 activated in accordance with implementations of various techniques described herein. As shown, the constant pressure device 130 may be filled with working fluid such that it produces a substantially constant pressure. Further, because the substantially constant pressure is greater than a pressure within the cavity 158, the working fluid may flow in a direction from the constant pressure device 130 to the well tank assembly 150. In particular, the working fluid may flow until the pressure within the well tank assembly 150 (i.e., the cavity 158) matches that of the pressure within the constant pressure device 130 (i.e., the inner tubing 132). The pressure within the cavity 158 may be calculated by multiplying a pressure gradient of the working fluid by a depth of the working fluid within the cavity 158.

Accordingly, given that the pressure within the cavity 158 matches that of the pressure within the inner tubing 132, the working fluid may be disposed within the cavity 158 and the inner tubing 132 at substantially the same height within each. Further, as shown in FIG. 3, given that the ESP 170 remains powered off, the separator tank 160 and the return pipe 162 may remain empty.

Figure 4:
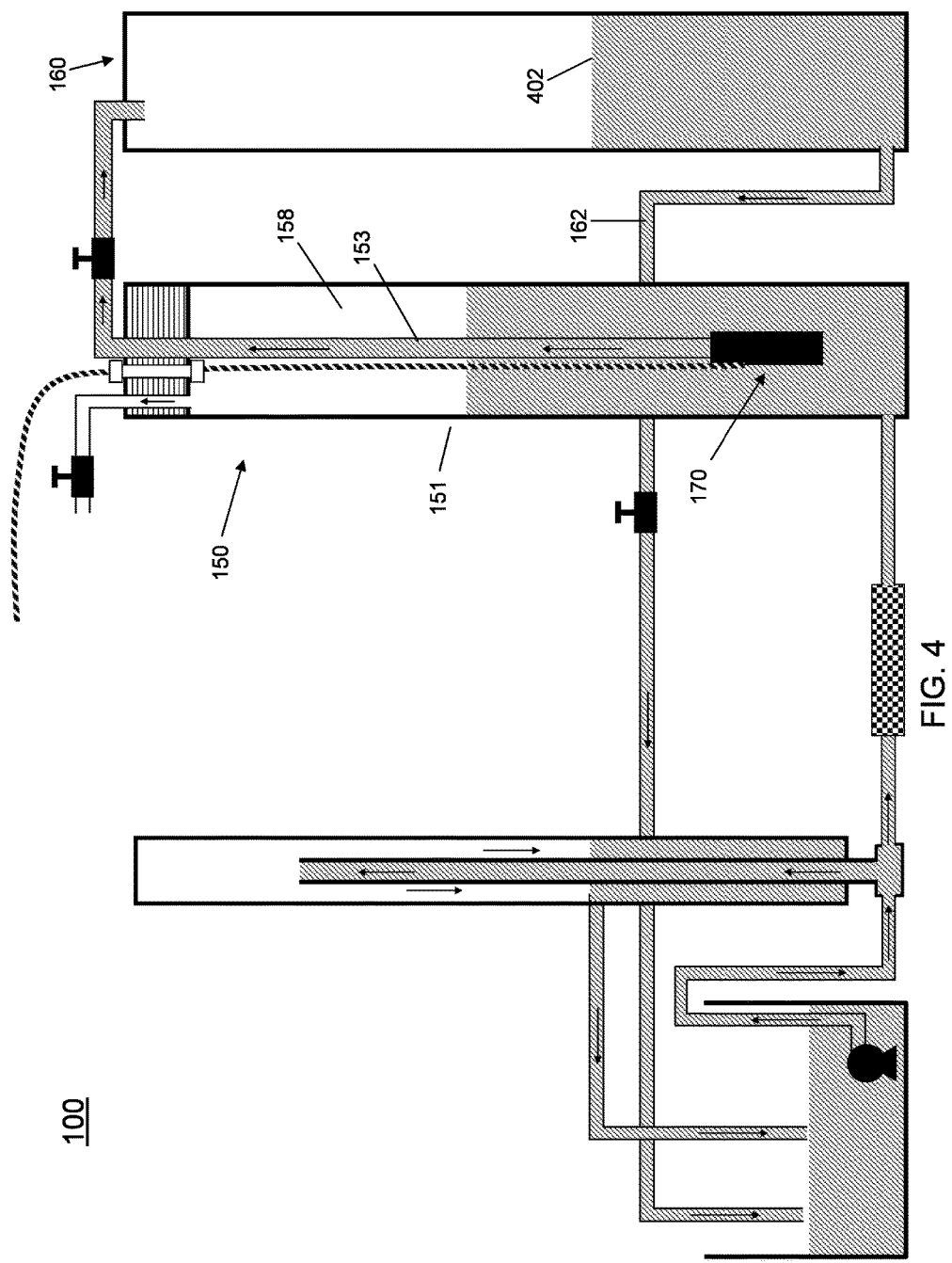
FIG. 4 illustrates an oil well simulation tool with an electric submersible pump activated in accordance with implementations of various techniques described herein.

At block 220, the lift mechanisms (e.g., the ESP 170) of the tool 100 may be activated. FIG. 4 illustrates an oil well simulation tool 100 with the ESP 170 activated in accordance with implementations of various techniques described herein. As shown, the ESP 170 may be activated, which may pump the working fluid from within the cavity 158 to the separator tank 160 via production pipe 153. The amount of working fluid within the cavity 158 may decrease until reaching a substantially stable depth. The working fluid may be at a substantially stable depth if there is substantially little fluctuation in the depth (i.e., height) of the working fluid in the cavity 158.

A pressure within the cavity 158 may be calculated by multiplying the pressure gradient of the working fluid by the now substantially stable depth of the working fluid within the cavity 158. This pressure within the cavity 158 may be used to simulate a well flowing pressure ($P_{WF}$) as is known in the art. In one implementation, the container 151 may be substantially transparent, allowing for a measurement of the substantially stable depth (i.e., height) of the working fluid within the cavity 158 from outside of the container 151.

Further, the separator tank 160 and the return pipe 162 may receive the working fluid from the well tank assembly 150, as shown in FIG. 4. In particular, the separator tank 160 may be filled with the working fluid up to a height 402.

At block 230, the return valve 164 of the tool 100 may be closed. As noted earlier, initially, the valves (e.g., production valve 154, gas valve 156, and return valve 164) may be open. With the return valve 164 closed, the return pipe 162 may not transfer the working fluid from the cavity of the separator tank 160 to the reservoir tank 120. Accordingly, the amount of working fluid within the separator tank 160 may increase. In one implementation, the return valve 164 of the tool 100 may not be closed until after the amount of working fluid within the cavity 158 reaches a substantially stable level.

At block 240, with the return valve 164 closed, a first amount of volume of the working fluid within the separator tank 160 may be determined. In particular, a height of the working fluid within the separator tank 160 may be measured, which may be measured at height 402, for example (as shown in FIG. 4). With the measured height and the known dimensions of the separator tank 160, the first amount of volume may be determined.

Figure 5:
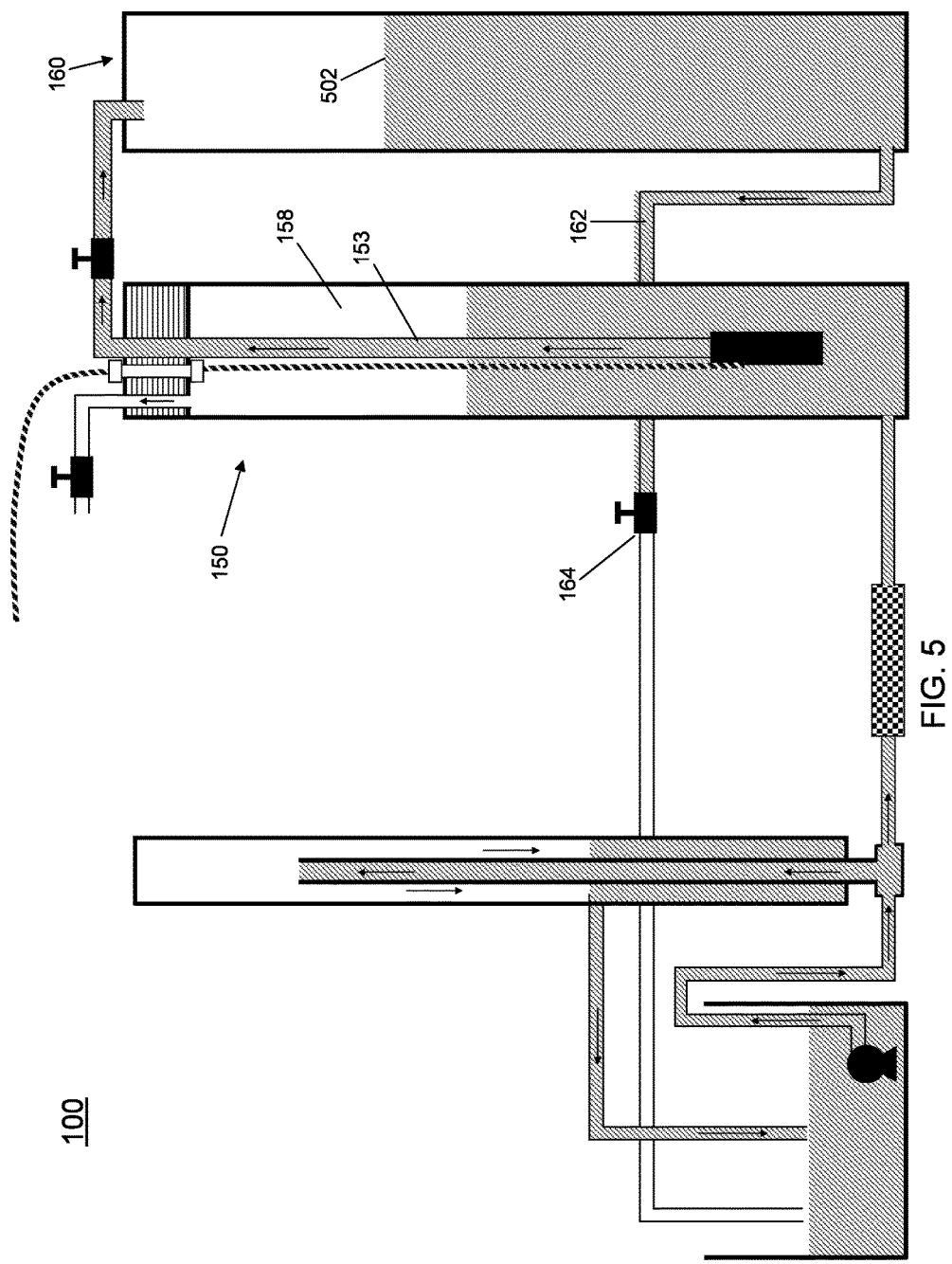
FIG. 5 illustrates an oil well simulation tool with a return valve closed after a predetermined amount of time in accordance with implementations of various techniques described herein.

At block 250, after a predetermined amount of time from when the height of the working fluid is first measured, a second amount of volume of the working fluid within the separator tank 160 may be determined. FIG. 5 illustrates an oil well simulation tool 100 with the return valve 164 closed after a predetermined amount of time in accordance with implementations of various techniques described herein. With the return valve 164 closed, the return pipe 162 may not transfer the working fluid from the cavity of the separator tank 160 to the reservoir tank 120.

Accordingly, after a predetermined amount of time, the amount of working fluid in the separator tank 160 may increase to a height 502. With the newly measured height and the known dimensions of the separator tank 160, the second amount of volume may be determined.

At block 260, a flow rate of the working fluid being produced by the well tank assembly 150 may be determined. In particular, the flow rate may be determined by subtracting the first amount of volume from the second amount of volume, and then dividing the difference by the predetermined amount of time.

Inflow Performance Relationship

The oil well simulation tool may be used to determine an inflow performance relationship (IPR) (as known to those skilled in the art) for an oil well. In one implementation, and as known to those skilled in the art, the IPR may be determined based on one or more well performance models, such as a productivity index and/or a Vogel correlation.

The productivity index may be determined based on Darcy's Law, as is known to those skilled in the art. In particular, the productivity index may be used to determine a production capability of an oil well. The performance index may be calculated for reservoir conditions where little or no gas exists in the reservoir. In one implementation, the productivity index may be the ratio of the production flow rate to the pressure drawdown. As shown in Equation 1, $$\text{Performance Index} = Q/(P_R - P_{WF}) \qquad \text{Equation 1}$$

where Q may represent the flow rate, $P_R$ may represent the reservoir pressure, and $P_{WF}$ may represent the well flowing pressure.

Using Equation 1, the oil well simulation tool may be used to simulate the determination of the productivity index for an oil well. As noted above with respect to block 260 of FIG. 2, Q may be the flow rate of the working fluid produced by a well tank assembly. As noted above with respect to the constant pressure device 130 of FIG. 1, $P_R$ may be determined using the substantially constant pressure within the inner tubing 132. As noted above with respect to block 220 of FIG. 2, $P_{WF}$ may be determined by multiplying the pressure gradient of the working fluid by the now substantially stable depth of the working fluid within the cavity 158.

The Vogel correlation is also known to those skilled in the art. Based on the Vogel correlation, the maximum oil production flow rate can be estimated and used to estimate the production rates for different well flowing pressures. The Vogel correlation may be used for reservoir conditions where gas does exist in the reservoir.

FIG. 6 illustrates an oil well simulation tool 600 with an air compressor 610 in accordance with implementations of various techniques described herein. As shown, oil well simulation tool 600 may be similar to that of the oil well simulation tool 100 as discussed above. In addition, the tool 600 may include the air compressor 610, air pipe 620, and the air valve 630. The air pipe 620 may be coupled to the air compressor 610 and to the pipe 142.

The oil well simulation tool 600 may be used to simulate the presence of gas in the reservoir. In particular, with the air valve 630 open and the air compressor 610 activated, air may be discharged from the air compressor 610 to the pipe 142 via the air pipe 620. The air in the pipe 142 and subsequently in the container 151 may affect a flow rate of the working fluid produced by a well tank assembly 150, such as by decreasing it. In such a scenario, the gas valve 156 may be closed.

Using the oil well simulation tool 600, the Vogel correlation may be determined. As shown in Equation 2, $$Q/Q_{max}=1-0.2(P_{WF}/P_R)-0.8(P_{WF}/P_R)^2 \quad \text{Equation 2}$$

where Q may represent the flow rate, $Q_{max}$ may represent the maximum flow rate, $P_R$ may represent the reservoir pressure, and $P_{WF}$ may represent the well flowing pressure. Q, $P_R$, and $P_{WF}$ may be determined using oil well simulation tool 600 in a similar manner as discussed above with respect to Equation 1. Further, the Vogel correlation may be determined when $P_{WF}$ is less than a bubble point pressure of the reservoir.

Accordingly, using the oil well simulation tools and the equations described above, the IPR may be determined.

Permeability

In one implementation, the permeable device 140 may be changed, such as by the type and size of its beads, marbles, or other media, in order to determine its effect on flow rate.

Pump-Off

A pump-off condition may occur in a well if a pump used to produce the reservoir fluid from an oil well overproduces an amount of reservoir fluid to the surface. In such a condition, a minimum amount of reservoir fluid in the oil well may not be available for the pump to produce. The pump-off condition may be simulated using the oil well simulation tool by, for example, using the ESP 170 of FIG. 1. In particular, the ESP 170 may be set to a higher pump speed in order to overproduce the working fluid in the separator tank 160. In such an example, the pump-off condition and its effects may be observed.

Workover and Gas Lift

A workover may be used in an oil well to change an artificial lift system, such as from an ESP to a gas lift. Such a change may be demonstrated using the oil well simulation tool, such as by removing the wellhead 157 (shown in FIG. 1), which would allow for the removal of the ESP 170 and the power cable 172 from the well tank assembly 150. The wellhead 157 may be reinserted into the container 151, with the gas pipe 155 and gas valve 156 intact.

In such an implementation, a gas lift may be used as an artificial lift mechanism to produce the working fluid from the cavity 158 via the production pipe 153. In particular, gas may be injected into the cavity 158 via the gas pipe 155 having its gas valve 156 open. The injection of the gas, mixed in with the working fluid, may lead to the production of the working fluid into the production pipe 153 and into the separator tank 160. In such an implementation, the air compressor 610 of FIG. 6 may also be used.

Gas Lock

In some scenarios, an abundance of gas produced from the reservoir may lead to a malfunction in the pumps used for artificial lift in oil wells. In one implementation, such scenarios may be simulated using, for example, the oil well simulation tool 600 shown in FIG. 6. In particular, the air compressor 610 may be configured to discharge an abundance of air into the well tank assembly 150, which may lead to a malfunction of the ESP 170.

Viscosity

In one implementation, the effect of varying viscosity on the production flow rate of an oil well and on pump performance may be simulated using the oil well simulation tool. In particular, the viscosity of the working fluid may be altered using techniques known to those in the art, such as by adding glycol into the working fluid in the reservoir tank 110 (shown in FIG. 1).

Flow Patterns

As noted above, in one implementation, the components of the oil well simulation tool, including the pipes and tubing, may be substantially transparent. In such an implementation, different flow patterns for both vertical production and horizontal pipelines of an oil well may be simulated and observed using the transparent components. Such flow patterns may include stratified, intermittent, annular, and dispersed bubble flow patterns for horizontal pipelines. The flow patterns may also include bubble flow, slug flow, and churn flow for vertical production.

Foam

In some scenarios, foam may be present in an annulus of the well. In one implementation, such scenarios may be simulated using the oil well simulation tool by introducing foamy or foam-inducing material into the working fluid in the reservoir tank, including material such as shampoo or soap.

Y-Tool and Blanking Plug

In some scenarios, a y-tool and/or a banking plug as known in the art may be disposed within an oil well. In one implementation, such scenarios may be simulated using the oil well simulation tool 100 of FIG. 1 by inserting a y-tool having two prongs into the container 151. In one prong, a blanking plug may be inserted, which can be removed using a fishing tool and/or fishing rod. An artificial lift means such as ESP 170 may be positioned in the other prong. Accordingly, wireline measurements may be simulated using the y-tool and blanking plug within the tool 100.

In sum, the implementations for an oil well simulation tool, described above with respect to FIGS. 1-6, may assist in understanding a simulation process and/or a production process for a hydrocarbon reservoir. As stated above, the oil well simulation tool may be used to reproduce actual operational conditions of a real world oil well at a smaller scale, which may assist with understanding various processes involved in oil production and/or the effect that the operational conditions may have on reservoir fluid production. The tool may also facilitate the understanding of the various processes and effects involved due to the substantially transparent nature of its components. The tool may also be used in various locations due to its ability to be assembled, disassembled, and reassembled.

In some implementation, an oil well simulation tool may be provided. The oil well simulation tool may include a reservoir tank configured to contain a working fluid, where the working fluid represents a reservoir fluid in a subterranean reservoir. The oil well simulation tool may also include a constant pressure device configured to receive the working fluid from the reservoir tank, where the constant pressure device is configured to maintain a substantially constant pressure within the device. The oil well simulation tool may further include a well tank assembly configured to receive the working fluid from a pipe coupled to the constant pressure device. The oil well simulation tool may additionally include a separator tank configured to receive the working fluid from the well tank assembly and configured to store the working fluid.

The oil well simulation tool may include a pumping mechanism disposed proximate to the reservoir tank and configured to pump the working fluid from the reservoir tank toward the constant pressure device. The oil well simulation tool may include a permeable device disposed between the constant pressure device and the well tank assembly, where the permeable device is configured to receive the working fluid from the reservoir tank and configured to simulate a permeability of the subterranean reservoir. The permeable device may include a container having a plurality of beads, marbles, or combinations thereof to simulate the permeability of the subterranean reservoir. The constant pressure device may include an inner tubing and an outer tubing, where the outer tubing is positioned concentrically around the inner tubing, and wherein the inner tubing is configured to be filled with working fluid, and the constant pressure device may also include an output pipe disposed between the outer tubing and the reservoir tank, where the output pipe is configured to transfer the working fluid back to the reservoir tank. The reservoir pump may be configured to discharge the working fluid at a minimum rate which maintains a substantially constant level of working fluid in the inner tubing, thereby producing the substantially constant pressure. The well tank assembly may include a container configured to receive the working fluid from the pipe coupled to the constant pressure device, a production pipe configured to transfer the working fluid from the container to the separator tank, and a production valve coupled to the production pipe, where the production valve is configured to control the flow of working fluid from the container to the separator tank. The well tank assembly may also include an electric submersible pump coupled to the production pipe and configured to pump the working fluid from the well tank assembly to the separator tank via the production pipe. The oil well simulation tool may include a return pipe disposed between the separator tank and the reservoir tank, where the return pipe is configured to transfer the working fluid from the separator tank to the reservoir tank, and the oil well simulation tool may also include a return valve coupled to the return pipe and configured to control the flow of working fluid from the separator tank to the reservoir tank. The oil well simulation tool may include an air compressor coupled to the pipe coupled to the constant pressure device and configured to discharge air into the working fluid to be received by the well tank assembly. Components of the oil well simulation tool may be configured to be disassembled and reassembled for transportation. Components of the oil well simulation tool may also be substantially transparent.

In some implementation, a method for using an oil well simulation tool may be provided. The method may include activating a lift mechanism of a well tank assembly in an oil well simulation tool, thereby transferring working fluid from the well tank assembly to a separator tank of the tool. The method may also include closing a return pipe coupled between the separator tank and a reservoir tanks, thereby transferring the working fluid from the separator tank to the reservoir tank. The method may further include determining a first amount of volume of the working fluid in the separator tank after the return pipe is closed. The method may additionally include determining a second amount of volume of the working fluid in the separator tank after a predetermined amount of time. The method may also include determining a flow rate of the working fluid in the oil well simulation tool based on the first amount of volume, the second amount of volume, and the predetermined amount of time.

In the method, the first amount and the second amount of volume of the working fluid may be determined based on a height of the working fluid in the separator tank and dimensions of the separator tank. In addition, the predetermined amount of time may be measured starting from when a height of the working fluid within the separator tank is first measured.

In some implementations, an oil well simulation tool may include one or more components configured to simulate an oil well site, where at least one of the one or more components is substantially transparent. At least one of the one or more components of the oil well simulation tool may be selected from a group consisting of: a reservoir tank, a constant pressure device, a permeable device, a well tank assembly, and a separator tank.

In some implementations, an oil well simulation tool may include a permeable device configured to simulate a permeability of a subterranean reservoir. The permeable device may be a container having a plurality of beads, marbles, or combinations thereof to simulate the permeability of the subterranean reservoir. In addition, the permeable device may also be disposed between a constant pressure device and a well tank assembly of the oil well simulation tool.

In some implementations, an oil well simulation tool may include a constant pressure device configured to maintain a substantially constant pressure within the device in order to simulate a pressure within a subterranean reservoir. The constant pressure device may include an inner tubing and an outer tubing, where the outer tubing is positioned concentrically around the inner tubing, and where the inner tubing is configured to be filled with working fluid. The constant pressure device may also include an output pipe configured to discharge the working fluid and to maintain a substantially constant level of working fluid in the inner tubing, thereby producing the substantially constant pressure.

In some implementations, an oil well simulation tool may include a reservoir tank configured to contain a working fluid, where the working fluid represents a reservoir fluid in a subterranean reservoir. The oil well simulation tool may also include a constant pressure device that includes an inner tubing and an outer tubing that is positioned concentrically around the inner tubing. The constant pressure device may be configured to receive the working fluid from the reservoir tank and maintain a substantially constant pressure within the device. The oil well simulation tool may further include a well tank assembly configured to receive the working fluid from a pipe coupled to the constant pressure device. The oil well simulation tool may additionally include a separator tank configured to receive the working fluid from the well tank assembly and configured to store the working fluid.

In the oil well simulation tool, the inner tubing may be configured to be filled with a substantially constant height of the working fluid. Further, the substantially constant pressure may be based on the substantially constant height of the working fluid and a pressure gradient of the working fluid, and the substantially constant pressure may simulate a constant pressure of the subterranean reservoir. In addition, well flowing pressure may be measured in a container of the well tank assembly once the working fluid is disposed at a substantially constant height in the container. Additionally, components of the oil well simulation tool may be substantially transparent.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. An oil well simulation tool, comprising:
    a reservoir tank configured to contain a working fluid, wherein the working fluid represents a reservoir fluid in a subterranean reservoir;
    a constant pressure device configured to:
        receive the working fluid from the reservoir tank, and
        maintain a substantially constant pressure within the device;
    a well tank assembly configured to receive the working fluid from a pipe coupled to the constant pressure device; and
    a separator tank configured to receive the working fluid from the well tank assembly and configured to store the working fluid.

2. The oil well simulation tool of claim 1, further comprising a pumping mechanism disposed proximate to the reservoir tank and configured to pump the working fluid from the reservoir tank toward the constant pressure device.

3. The oil well simulation tool of claim 1, further comprising a permeable device disposed between the constant pressure device and the well tank assembly, wherein the permeable device is configured to:
    receive the working fluid from the reservoir tank, and
    simulate a permeability of the subterranean reservoir.

4. The oil well simulation tool of claim 3, Wherein the permeable device is a container having a plurality of beads, marbles, three-dimensional media, or combinations thereof to simulate the permeability of the subterranean reservoir.

5. The oil well simulation tool of claim 1, wherein the constant pressure device comprises:
    an inner tubing and an outer tubing, wherein the outer tubing is positioned concentrically around the inner tubing, and wherein the inner tubing is configured to be filled with working fluid; and
    an output pipe disposed between the outer tubing and the reservoir tank, wherein the output pipe is configured to transfer the working fluid back to the reservoir tank.

6. The oil well simulation tool of claim 5, wherein the reservoir pump is configured to discharge the working fluid at a minimum rate which maintains a substantially constant level of working fluid in the inner tubing, thereby producing the substantially constant pressure.

7. The oil well simulation tool of claim 1, wherein the well tank assembly further comprises:
    a container configured to receive the working fluid from the pipe coupled to the constant pressure device;
    a production pipe configured to transfer the working fluid from the container to the separator tank; and
    a production valve coupled to the production, pipe, wherein the production valve is configured to control the flow of working fluid from the container to the separator tank.

8. The oil well simulation tool of claim 7, wherein the well tank assembly further comprises:
    an electric submersible pump coupled to the production pipe and configured to pump the working fluid from the well tank assembly to the separator tank via the production pipe.

9. The oil well simulation tool of claim 1, further comprising;
    a return pipe disposed between the separator tank and the reservoir tank, wherein the return pipe is configured to transfer the working fluid from the separator tank to the reservoir tank; and
    a return valve coupled to the return pipe and configured to control the flow of working fluid from the separator tank to the reservoir tank.

10. The oil well simulation tool of claim 1, further comprising:
    an air compressor coupled to the pipe coupled to the constant pressure device and configured to discharge air into the working fluid to be received by the well tank assembly.

11. The oil well simulation tool of claim 1, wherein components of the oil well simulation tool are configured to be disassembled and reassembled for transportation.

12. The oil well simulation tool of claim 1, wherein components of the oil well simulation tool are substantially transparent.

13. A method, comprising:
    activating a lift mechanism of a well tank assembly in an oil well simulation tool, thereby transferring working fluid from the well tank assembly to a separator tank of the tool;
    closing a return pipe coupled between the separator tank and a reservoir tank, thereby transferring the working fluid from the separator tank to the reservoir tank;
    determining a first amount of volume of the working fluid in the separator tank after the return pipe is closed;
    determining a second amount of volume of the working fluid in the separator tank after a predetermined amount of time; and
    determining a flow rate of the working fluid in the oil well simulation tool based on the first amount of volume, the second amount of volume, and the predetermined amount of time.

14. The method of claim 13, wherein the first amount and the second amount of volume of the working fluid are determined based on a height of the working fluid in the separator tank and dimensions of the separator tank.

15. The method of claim 13, wherein the predetermined amount of time is measured starting from when a height of the working fluid within the separator tank is first measured.

16. An oil well simulation tool, comprising:
    a reservoir tank configured to contain a working fluid, wherein the working fluid represents a reservoir fluid in a subterranean reservoir;
    a constant pressure device that includes an inner tubing and an outer tubing that is positioned concentrically around the inner tubing, wherein the constant pressure device is configured to:
        receive the working fluid from the reservoir tank, and
        maintain a substantially constant pressure within the device;
    a well tank assembly configured to receive the working fluid from a pipe coupled to the constant pressure device; and
    a separator tank configured to receive the working fluid from the well tank assembly and configured to store the working fluid.

17. The oil well simulation tool of claim 16, wherein the inner tubing is configured to be filled with a substantially constant height of the working fluid.

18. The oil well simulation tool of claim 17, wherein the substantially constant pressure is based on the substantially constant height of the working fluid and a pressure gradient of the working fluid, and wherein the substantially constant pressure simulates a constant pressure of the subterranean reservoir.

19. The oil well simulation tool of claim 16, wherein well flowing pressure is measured in a container of the well tank assembly once the working fluid is disposed at a substantially constant height in the container.

20. The oil well simulation tool of claim 16, wherein components of the oil well simulation tool are substantially transparent.

* * * * *